Feb. 24, 1970   HANS-WALTHER BRANDT ET AL   3,497,566
PROCESS FOR THE PRODUCTION OF ISOPRENE FROM $C_5$-FRACTIONS
SUBSTANTIALLY FREE OF PARAFFINS AND OLEFINS
BY EXTRACTIVE DISTILLATION OF
CYCLOPENTADIENE WITH ANILINE
Filed Aug. 30, 1968
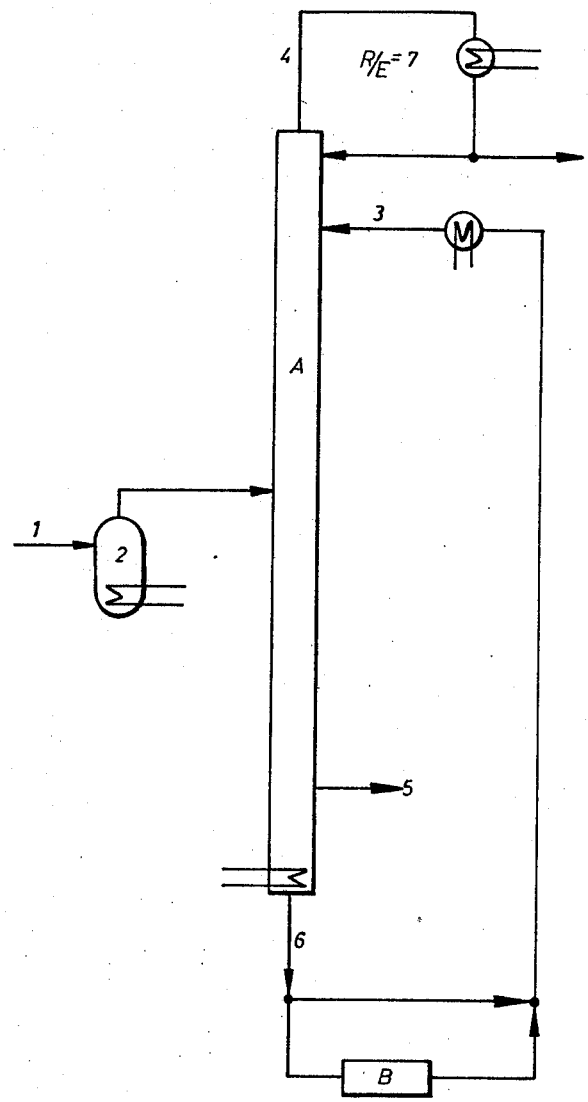
INVENTORS:
BERNHARD SCHLEPPINGHOFF, HELMUT SCHERB, WOLFGANG SWODENK, HANS-WALTHER
BRANDT, BRUNO ENGELHARD, HEINRICH STEUDE.
BY:
Attorneys

United States Patent Office 3,497,566
Patented Feb. 24, 1970

3,497,566
PROCESS FOR THE PRODUCTION OF ISOPRENE FROM C₅-FRACTIONS SUBSTANTIALLY FREE OF PARAFFINS AND OLEFINS BY EXTRACTIVE DISTILLATION OF CYCLOPENTADIENE WITH ANILINE
Hans-Walther Brandt, Cologne-Flittard, Bruno Engelhard, Cologne-Stammheim, Heinrich Steude, Leverkusen-Schlebusch, Bernhard Schleppinghoff, Dormagen, Helmut Scherb, Sinnersdorf, and Wolfgang Swodenk, Leverkusen, Germany, assignors to Farbenfabriken Bayer Aktiengesellschaft and Erdolchemie Gesellschaft mit beschrankter Haftung, both of Leverkusen, Germany, both corporations of Germany
Filed Aug. 30, 1968, Ser. No. 756,445
Claims priority, application Germany, Sept. 5, 1967, 1,668,015
Int. Cl. C07c 7/08; B01d 3/40
U.S. Cl. 260—681.5                                     6 Claims

ABSTRACT OF THE DISCLOSURE

Process for the separation of isoprene from mixtures thereof with $C_5$-diolefins which mixtures may additionally contain $C_5$-acetylene, cyclopentane and cyclopentene, by extractive distillation characterized by the use of aniline as the selective solvent, the aniline preferably containing 1 to 5% by weight of water. The mixtures treated may be obtained from the $C_5$-hydrocarbon cut of a naphtha cracker which has previously been treated by extractive distillation with a selective solvent such as N-methyl pyrrolidone, acetonitrile or even aniline.

---

This invention relates to a process for the production of isoprene from $C_5$-fractions substantially free of paraffins and olefins.

It is known that isoprene can be separated from hydrocarbon fractions essentially containing diolefins and in some cases $C_5$-acetylenes, cyclopentene and cyclopentane, by extractive distillation with N-methyl pyrrolidone as the selective solvent. As a rule, residual 1,3-pentadiene and cyclopentadiene contents of from 0.05 to 1% by weight are obtained in this process.

In some cases, it is desirable to obtain residual 1,3-pentadiene contents of less than 100 p.p.m. by weight and cyclopentadiene contents of less than 1 p.p.m. by weight in the pure isoprene. Basically these purity levels may also be obtained with N-methyl pyrrolidone as the solvent although in this case the amount of solvent required, the return flow ratio and the number of plates required in the column are all extremely large.

We have now found that isoprene can be produced particularly economically from an isoprene-containing hydrocarbon mixture mainly containing $C_5$-diolefins and, in some cases, $C_5$-acetylenes, cyclopentene and cyclopentane, by subjecting the hydrocarbon mixture to extractive distillation in the presence of aniline as the selective solvent.

The starting mixture for the process according to the invention may be obtained from $C_5$-hydrocarbon cuts of naphtha crackers in a preceding extractive distillation with selective solvents such as N-methyl pyrrolidone, acetonitrile or even aniline. Apart from isoprene, the starting mixture essentially contains 1,3-pentadiene cyclopentadiene and $C_5$-acetylenes, cyclopentene and cyclopentane. Besides these, smaller quantities of other hydrocarbons may also be present.

The process according to the invention may be carried out for example, as shown in the accompanying drawing. A starting mixture 1 is evaporated in an evaporator 2 and fed into the central part of an extractive distillation column A. Aniline used as a selective solvent is fed in through a pipe 3 a few plates below the head of the column. From 1% to 5% by weight of water is advantageously added to the aniline in order to increase its selectivity and to lower its boiling point.

A crude isoprene, which, in addition to cyclopentane, contains less than 100 p.p.m. by weight of 1,3-pentadiene and less than 1 p.p.m. by weight of cyclopentadiene, is let out from the head of the column through a pipe 4. This fraction is condensed, some of it being recycled to the head of the column. The rest of the head product is fed into a column in which cyclopentane and residual traces of less readily boiling components are separated by normal distillation.

The aniline fed through the pipe 3 takes up hydrocarbons—isoprene and the contaminants—in a quantity of from 10 to 30% by weight and preferably in a quantity of 25% by weight. The pentadiene fraction is removed in vapour form through a pipe 5 in the lower part of column A a few plates above the sump. The stream of liquid solvent is removed at the bottom of the column through a pipe 6 and recycled to the head of the column. A small component stream is worked up in the regeneration column B. The extractive distillation is carried out at normal pressure or slightly increased pressure up to 2 ata.

The invention is illustrated by the following examples.

EXAMPLE 1

400 cc./hour of a diolefin fraction of the following composition are introduced into a 50 mm. 130-plate test column in vapour from at the 40th plate:

|   | Percent by weight |
|---|---|
| Pentenes | 0.20 |
| Cyclopentane | 0.20 |
| Cyclopentene | 1.16 |
| Isoprene | 43.51 |
| Diethyl ether | 1.26 |
| Trans-1,3-pentadiene | 5.57 |
| Cis-1,3-pentadiene | 1.00 |
| Cyclopentadiene | 47.10 |

The recycle ratio in the column is 7:1. Aniline containing 3% by weight $H_2O$ is fed in 5 plates below the head of the column in a quantity of 2500 cc./hour and at a temperature of 35° C. 185 cc./hour of crude isoprene with the following composition are run off from the head of the column:

|   | Percent by weight |
|---|---|
| Pentenes | 0.46 |
| Cyclopentane | 0.46 |
| Isoprene | 99.08 |
| 1,3-pentadiene | 0.008 |
| Cyclopentadiene, less than | 0.0001 |

The head temperature is 34° C. and the pressure is 760 torr. The sump temperature amounts to 130° C. 215 cc./hour are let off from the vapour phase at the 10th plate above the sump. This cyclopentadiene fraction has the following composition:

|   | Percent by weight |
|---|---|
| Cyclopentene | 2.0 |
| Isoprene | 1.5 |
| Diethyl ether | 2.2 |
| Trans-1,3-pentadiene | 9.8 |
| Cis-1,3-pentadiene | 1.8 |
| Cyclopentadiene | 82.7 |

EXAMPLE 2

400 cc./hour of a diolefin fraction of the following composition are fed in vapour form into a column of a kind described in Example 1:

| | Percent by weight |
|---|---|
| Pentenes | 0.21 |
| Cyclopentane | 0.51 |
| Cyclopentene | 1.38 |
| Isoprene | 41.56 |
| Trans-1,3-pentadiene | 20.61 |
| Cis-1,3-pentadiene | 10.31 |
| Cyclopentadiene | 25.42 |

Aniline without any water added to it was used as the selective solvent in a quantity of 2000 cc./hour and at a temperature of 40° C. The test was carried out in the same way and under the same conditions as described in Example 1.

Under these test conditions, the results were as follows: 165 cc./hour of head product of the following composition

| | Percent by weight |
|---|---|
| Pentenes | 0.51 |
| Cyclopentane | 1.23 |
| Isoprene | 98.26 |
| 1,3-pentadiene | 0.008 |
| Cyclopentadiene, less than | 0.0001 | and a cyclopentadiene fraction of 235 cc./hour with the following composition:

| | Percent by weight |
|---|---|
| Cyclopentene | 1.38 |
| Isoprene | 1.50 |
| Trans-1,3-pentadiene | 35.17 |
| Cis-1,3-pentadiene | 17.59 |
| Cyclopentadiene | 43.38 |

What is claimed is:

1. In the process for the separation of isoprene from mixtures thereof with $C_5$-diolefins by extractive distillation, the improvement which comprises using aniline as a selective solvent in the extractive distillation.

2. Improvement according to claim 1 in which said aniline contains 1 to 5% by weight of water.

3. Improvement according to claim 1 in which said mixture additionally contains at least one component of the group consisting of $C_5$-acetylene, cyclopentane and cyclopentene.

4. Improvement according to claim 3 in which said aniline contains 1 to 5% by weight of water.

5. Improvement according to claim 1 in which said mixture is a mixture obtained from a $C_5$-hydrocarbon cut of a naphtha cracker by extractive distillation in the presence of a selective solvent selected from the group consisting of N-methyl pyrrolidone and acetonitrile.

6. Improvement according to claim 1 in which said mixture is a mixture obtained from a $C_5$-hydrocarbon cut of a naphtha cracker by extractive distillation in the presence of an aniline as a selective solvent.

References Cited

UNITED STATES PATENTS

| 2,366,361 | 1/1945 | Semon et al. | 203—57 |
| 3,230,157 | 1/1966 | Hill et al. | 260—681.5 X |
| 3,284,339 | 11/1966 | Begley et al. | 260—681.5 X |
| 3,320,138 | 5/1967 | Brandt et al. | 203—58 |
| 3,344,198 | 9/1967 | Weitz et al. | 260—666 |

DELBERT E. GANTZ, Primary Examiner

G. E. SCHMITKONS, Assistant Examiner

U.S. Cl. X.R.

203—51, 53, 59